(12) United States Patent
Omori

(10) Patent No.: US 6,239,666 B1
(45) Date of Patent: May 29, 2001

(54) UNIFORM AMPLITUDE MODULATOR

(75) Inventor: Youko Omori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/203,992

(22) Filed: Dec. 2, 1998

(30) Foreign Application Priority Data

Dec. 3, 1997 (JP) .................................................. 9-347317

(51) Int. Cl.$^7$ ..................................................... H03C 1/02
(52) U.S. Cl. .......................... 332/103; 375/298; 375/300; 375/305; 375/308
(58) Field of Search ........................... 332/103; 375/298, 375/269, 274, 300, 305, 308

(56) References Cited

U.S. PATENT DOCUMENTS 3,849,595 * 11/1974 Ishiguro .
4,696,017 * 9/1987 Masheff et al. ....................... 375/298

FOREIGN PATENT DOCUMENTS 62-85538 4/1987 (JP) .
4-252634 9/1992 (JP) .
4-255140 9/1992 (JP) .

* cited by examiner

*Primary Examiner*—Arnold Kinkead
(74) *Attorney, Agent, or Firm*—Ostrolenk, Faber, Gerb & Soffen, LLP

(57) ABSTRACT

A uniform amplitude modulator includes in-phase component & quadrature component generation units and a modulated signal generation unit. The in-phase component & quadrature component generation units receive data represented by phase information and generate in-phase and quadrature components as analog signals. The modulated signal generation unit receives the in-phase and quadrature components and generates a modulated signal whose amplitude is uniform. One of the in-phase component & quadrature component generation units is constituted by a device for outputting an analog signal having any one of three, predetermined positive and negative values associated with the phase information, and 0. The other is constituted by a device for outputting an analog signal associated with the phase information.

7 Claims, 8 Drawing Sheets

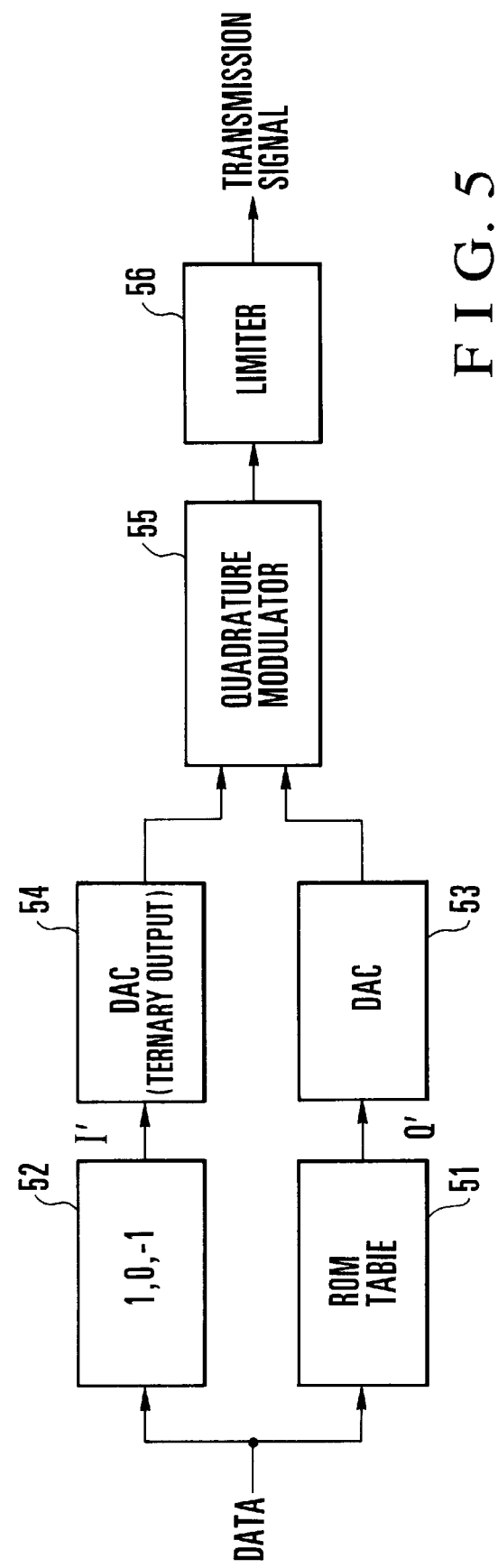
F I G. 5

| DATA | θ | I' | Q' |
|---|---|---|---|
| 0 0 0 0 | 0 | 0 | 1 |
| 0 0 0 1 | π/8 | 1 | 2.4 |
| 0 0 1 0 | 2π/8 | 1 | 1 |
| 0 0 1 1 | 3π/8 | 1 | 0.4 |
| 0 1 0 0 | 4π/8 | 1 | 0 |
| 0 1 0 1 | 5π/8 | 1 | -0.4 |
| 0 1 1 0 | 6π/8 | 1 | -1 |
| 0 1 1 1 | 7π/8 | 1 | -2.4 |
| 1 0 0 0 | π | 0 | -1 |
| 1 0 0 1 | 9π/8 | -1 | -2.4 |
| 1 0 1 0 | 10π/8 | -1 | -1 |
| 1 0 1 1 | 11π/8 | -1 | -0.4 |
| 1 1 0 0 | 12π/8 | -1 | 0 |
| 1 1 0 1 | 13π/8 | -1 | 0.4 |
| 1 1 1 0 | 14π/8 | -1 | 1 |
| 1 1 1 1 | 15π/8 | -1 | 2.4 |
F I G. 7
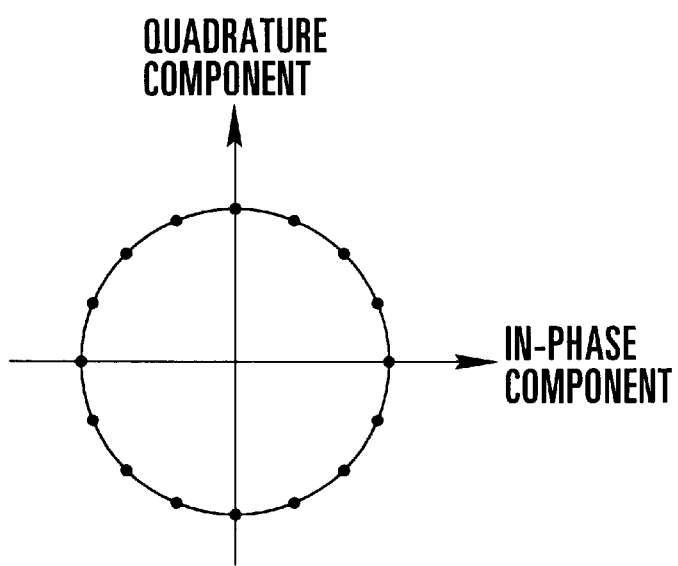
F I G. 8

| INTEGRATED VALUE OF DATA (mod 4) | | | I' | Q' |
|---|---|---|---|---|
| $D_0$ | $D_1$ | $D_2$ | | |
| 0 | 1 | 2 | 1 | 0 |
| 0 | 1 | 0 | 1 | 0.62 |
| 0 | 3 | 2 | -1 | 0 |
| 0 | 3 | 0 | -1 | 0.62 |
| 1 | 2 | 3 | 0 | -1 |
| 1 | 2 | 1 | 1 | -1.6 |
| 1 | 0 | 3 | 0 | 1 |
| 1 | 0 | 1 | 1 | 1.6 |
| 2 | 3 | 0 | -1 | 0 |
| 2 | 3 | 2 | -1 | -0.62 |
| 2 | 1 | 0 | 1 | 0 |
| 2 | 1 | 2 | 1 | -0.62 |
| 3 | 0 | 1 | 0 | 1 |
| 3 | 0 | 3 | -1 | 1.6 |
| 3 | 2 | 1 | 0 | -1 |
| 3 | 2 | 3 | -1 | -1.6 |

FIG. 10

UNIFORM AMPLITUDE MODULATOR

BACKGROUND OF THE INVENTION

The present invention relates to a modulator for generating a waveform by digital processing in a communication apparatus and, more particularly, to a modulation system for making the amplitude of a transmission waveform uniform.

In an apparatus for generating an analog waveform signal to be transmitted by a modulator using digital processing in data transmission, a modulator for outputting an analog signal waveform with reference to data of a memory device using an input signal as an address is known (see, e.g., Japanese Patent Laid-Open No. 62-85538). FIG. 1 shows a modulator disclosed in this reference. This modulator comprises two memory devices 11 and 12 for generating quadrature and in-phase components of an analog waveform like the one shown in FIG. 2.

The modulator shown in FIG. 1 comprises the two memory devices 11 and 12 for generating quadrature and in-phase components of an analog waveform, and two D/A converters 13 and 14 for converting digital values from the memory devices 11 and 12 into analog values. The memory device is generally large in circuit scale. As the precision of an output signal increases, the circuit scale further increases, posing a problem in downsizing the modulator. The D/A converter greatly consumes the power for a higher speed and higher precision, posing a problem in reducing power consumption of the modulator.

SUMMARY OF THE INVENTION

The present invention has been made to solve the above problem, and has as its object to provide a modulator capable of reducing the circuit scale and power consumption by reducing the scales of the memory device and D/A converter.

To achieve the above object, according to the present invention, there is provided a uniform amplitude modulator comprising means for receiving data represented by phase information and generating in-phase and quadrature components as analog signal components, and means for receiving the in-phase and quadrature components and generating a modulated signal whose amplitude is uniform, one of the means for generating in-phase and quadrature components being constituted by a device for outputting an analog signal component having any one of three, predetermined positive and negative values associated with the phase information, and 0, and the other being constituted by a device for outputting an analog signal component associated with the phase information.

BRIEF DESCRIPTION OF THE DRAWINGS

FIG. 5 is a block diagram showing an example of application of the present invention to a 16-phase PSK modulator;

FIG. 7 is a table showing a ROM table in FIG. 5;

FIG. 8 is a graph showing a 16-phase PSK modulated signal point;

FIG. 10 is a table showing a ROM table in FIG. 9.

DESCRIPTION OF THE PREFERRED EMBODIMENTS

Figure 1:
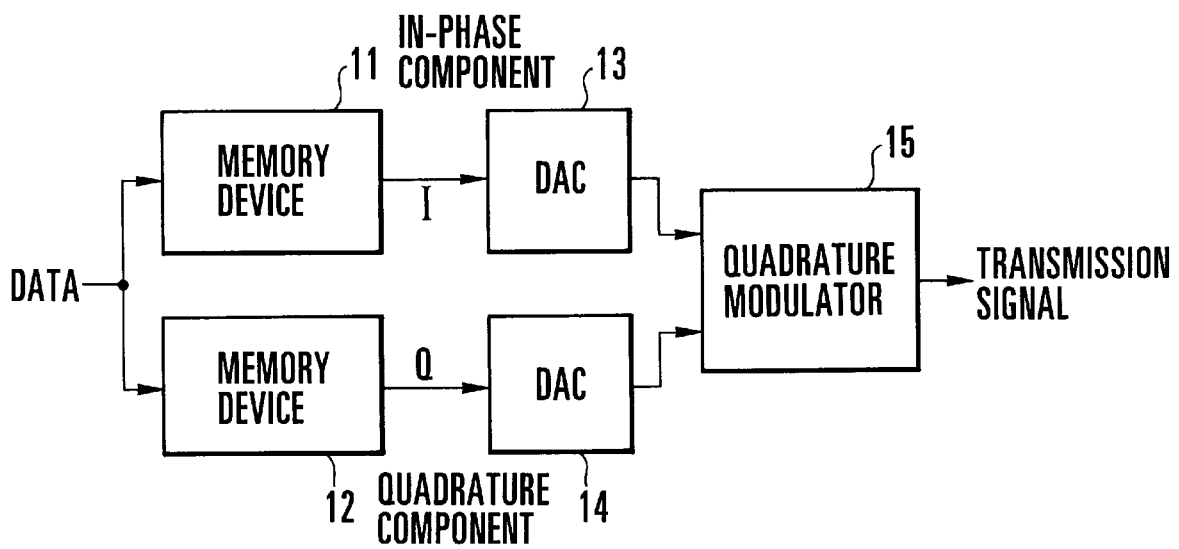
FIG. 1 a block diagram showing an example of a conventional uniform amplitude modulator.
Figure 2:
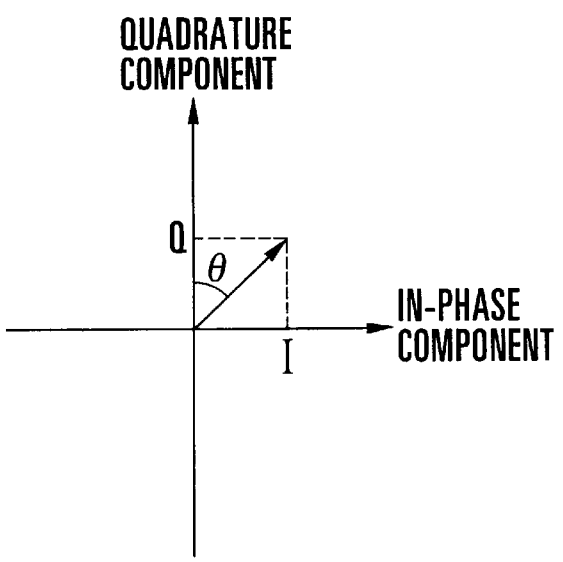
FIG. 2 is a graph for explaining the signal components of a modulated signal.
Figure 3:
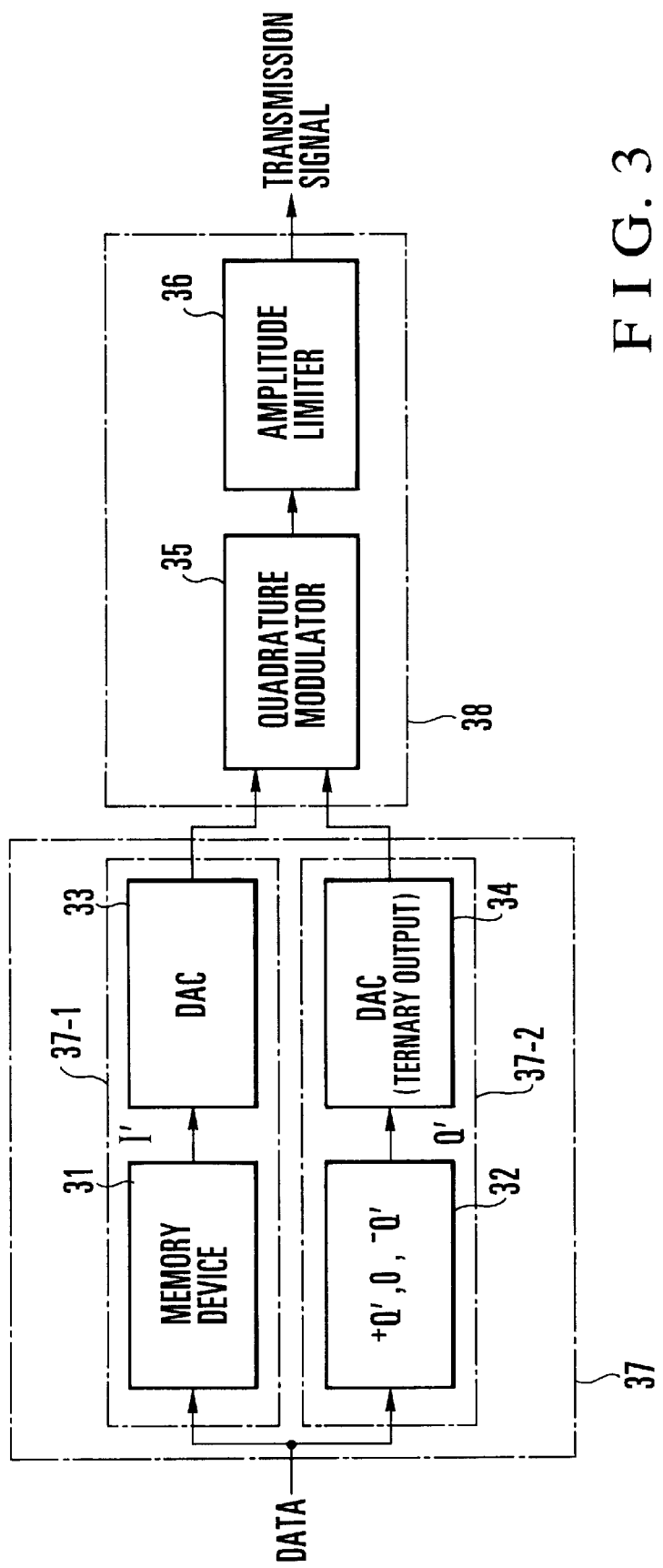
FIG. 3 is a block diagram showing a uniform amplitude modulator according to an embodiment of the present invention.

FIG. 3 shows an embodiment of the present invention. As shown in FIG. 3, this modulator comprises a memory device (ROM table) 31, a selector 32 for selecting and outputting the presence/absence and sign of a signal, a D/A converter 33, a ternary D/A converter 34, a quadrature modulator 35, and an amplitude limiter 36 for limiting the amplitude of the signal.

In this embodiment, the memory device 31 and the D/A converter 33 constitute a first analog signal converter 37-1. The selector 32 for selecting and outputting the presence/absence and sign of the signal, and the ternary output D/A converter 34 constitute a second analog signal converter 37-2. The first and second analog signal converters 37-1 and 37-2 constitute an in-phase component & quadrature component (analog signal) generation means 37. The quadrature modulator 35 and amplitude limiter 36 constitute a modulated signal generation means 38 for generating a modulated signal whose amplitude is uniform.

Figure 4A:
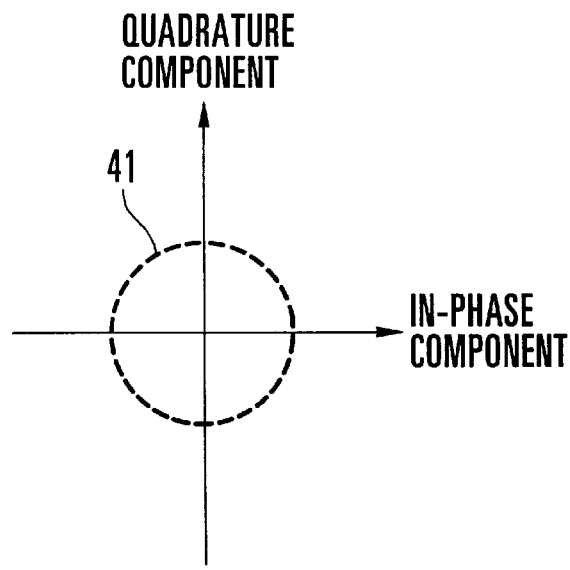
FIGS. 4A, 4B, and 4C are graphs for explaining the principle of operation of the present invention.
Figure 4B:
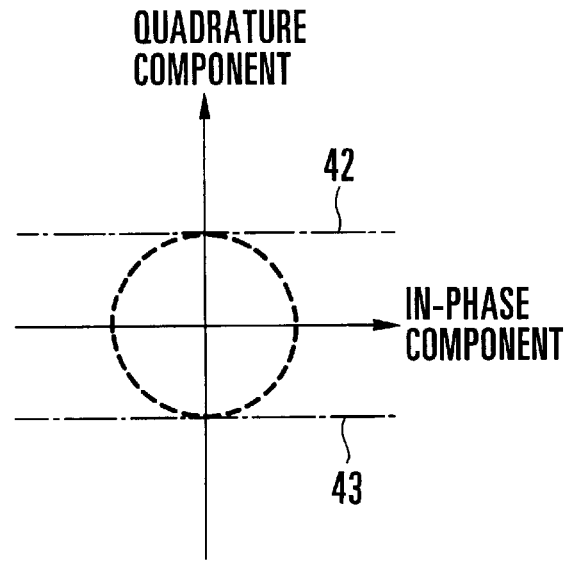

Operation of the modulator will be described with reference to FIGS. 4A, 4B, and 4C. A desired transmission signal is represented as a point on a circle 41 indicated by the dotted line in FIG. 4A. I' represents an output from the memory device 31 in FIG. 3, and Q' represents an output from the selector 32 for outputting the presence/absence and sign of the signal. The output Q' takes one of values indicated by the chain lines in FIG. 4B and 0.

Figure 4C:
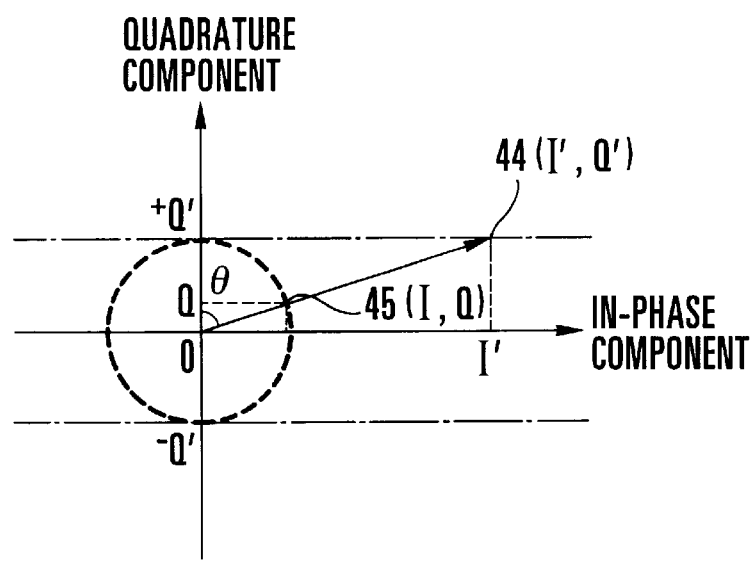

When a desired transmission signal point is a signal 45 (I, Q) in FIG. 4C, if the output I' from the memory device 31 is set to a value like the one shown in FIG. 4C, the quadrature modulator 35 outputs a signal 44 (I', Q'). This signal is limited by the amplitude limiter 36 to obtain a desired transmission signal (I, Q).

When a value θ shown in FIG. 4C changes within the range of $-\pi/2<\theta<\pi/2$, if only the digital value of the in-phase component I' is changed using the memory device 31 without changing the value of the quadrature component Q', a desired transmission signal can be obtained in combination with the amplitude limiter 36. Similarly, when the value θ changes within the ranges of $-\pi<\theta<-\pi/2$ and $\pi/2<\theta<\pi$, only the sign is inverted without changing the value of the quadrature component Q', only the digital value of the in-phase component I' is changed using the memory device 31, and the amplitude is limited, thereby obtaining a desired transmission signal.

That is, to achieve the above object, the present invention reduces the numbers of memory devices and D/A converters by giving attention to the fact that the amplitude suffices to be finally limited in a modulator for making the amplitude uniform by PSK (Phase Shift Keying) modulation or the like. The phase amount θ represents an accurate signal value. A signal having an arbitrary amplitude is generated, and the amplitude of this signal is limited by the limiter to obtain a desired modulated signal.

Since the amplitude is arbitrary, memory devices need not be prepared for both in-phase and quadrature components, and either component can be generated by an output from the selector. The output from the selector can be converted into an analog signal component using a ternary output D/A converter.

With this arrangement, two memory devices necessary for the conventional modulator can be reduced to one. One of the D/A converters can be realized by a simple ternary output D/A converter.

FIG. 5 shows the case in which the present invention is applied to the baseband signal generation circuit of a 16-phase PSK modulator. FIGS. 6A, 6B, 6C, and 6D show the signal generation procedure. FIG. 7 shows the contents of a ROM table 51 in FIG. 5. In the 16-phase PSK modulation, a 4-bit input signal is transmitted as phase information. As shown in FIG. 8, a modulated signal takes any value of 16 points on the circumference.

In FIG. 5, the ROM table 51 is used as a memory device and outputs a quadrature component Q'. A selector 52 is used as a selection device for outputting the presence/absence and sign of a signal, and selects and outputs any one of three values 1, 0, and −1.

As shown in FIG. 5, the baseband signal generation circuit of the 16-phase PSK modulator according to the present invention is constituted by the ROM table 51, the selector 52, a D/A converter 53, a ternary D/A converter 54, a quadrature modulator 55, and a limiter 56.

Figure 6A:
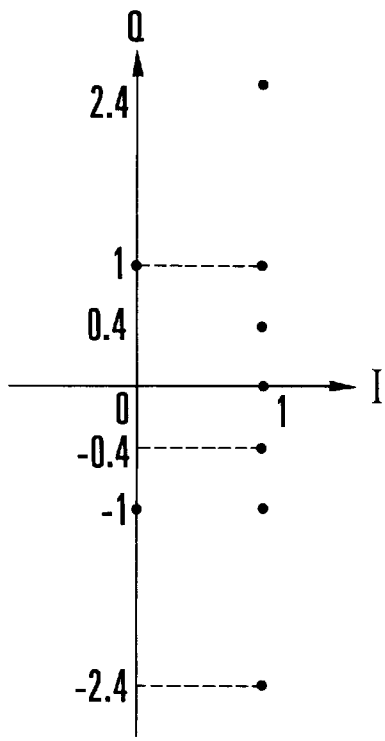
FIGS. 6A, 6B, 6C, and 6D are graphs for explaining the principle of operation in FIG. 5.
Figure 6B:
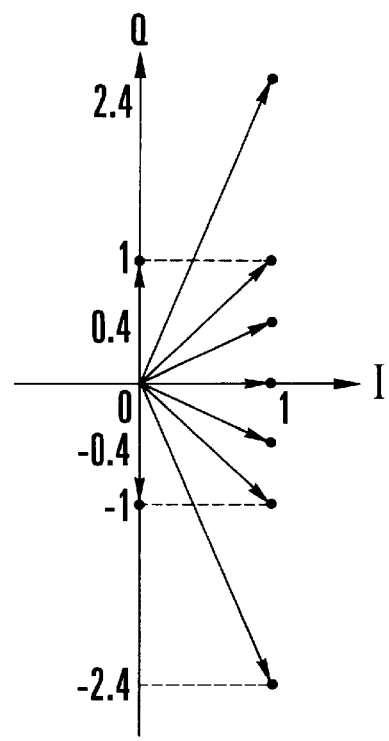

FIGS. 6A, 6B, 6C, and 6D show the signal generation procedure for input data of 0000 to 1000. As shown in FIG. 6A, a signal Q' (0, ±0.4, ±1, ±2.4) output from the ROM table 51 and a signal I' (0, ±1) output from the selector 52 are respectively set as quadrature and in-phase components using an input signal θ as an address. The quadrature and in-phase components are respectively converted into analog signal components by the D/A converter 53 and ternary D/A converter 54. The analog signal components are input to the quadrature modulator 55 to generate a prototype signal for a baseband signal like the one shown in FIG. 6B.

In this case, the quadrature component Q' takes one of values shown in FIG. 7 for the phase information θ. As shown in FIG. 7, an output from the selector 52 is selected such that the in-phase component I' is +1 when the start bit of input data is 0, −1 when the start bit is 1, and 0 when all the remaining three bits are 0.

Figure 6C:
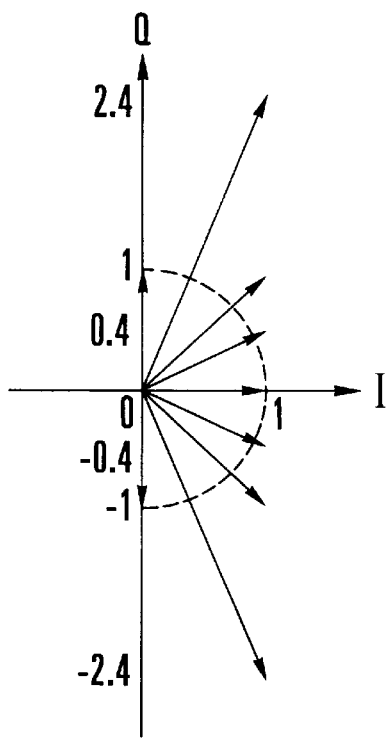
Figure 6D:
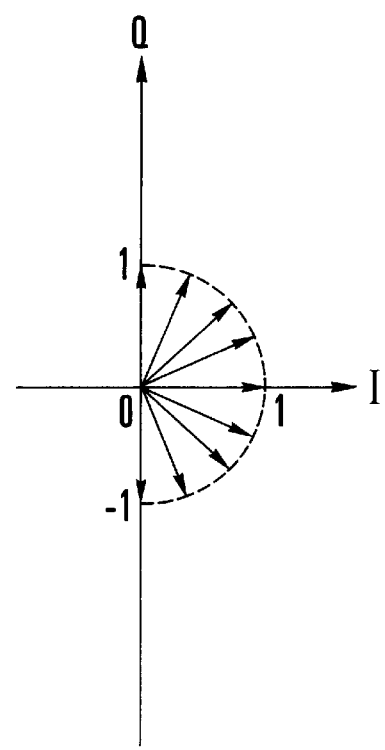

As shown in FIG. 6C, the prototype signal is passed through the limiter 56 in order to limit the amplitude with a circle having a radius of 1 represented by the dotted line. The signal obtained finally moves on the circumference, as shown in FIG. 6D. This procedure is for input data of 0000 to 1000. The same procedure can also apply to input data of 1001 to 1111, and a 16-phase PSK modulated baseband signal like the one shown in FIG. 8 can be obtained by the circuit shown in FIG. 5.

Figure 9:
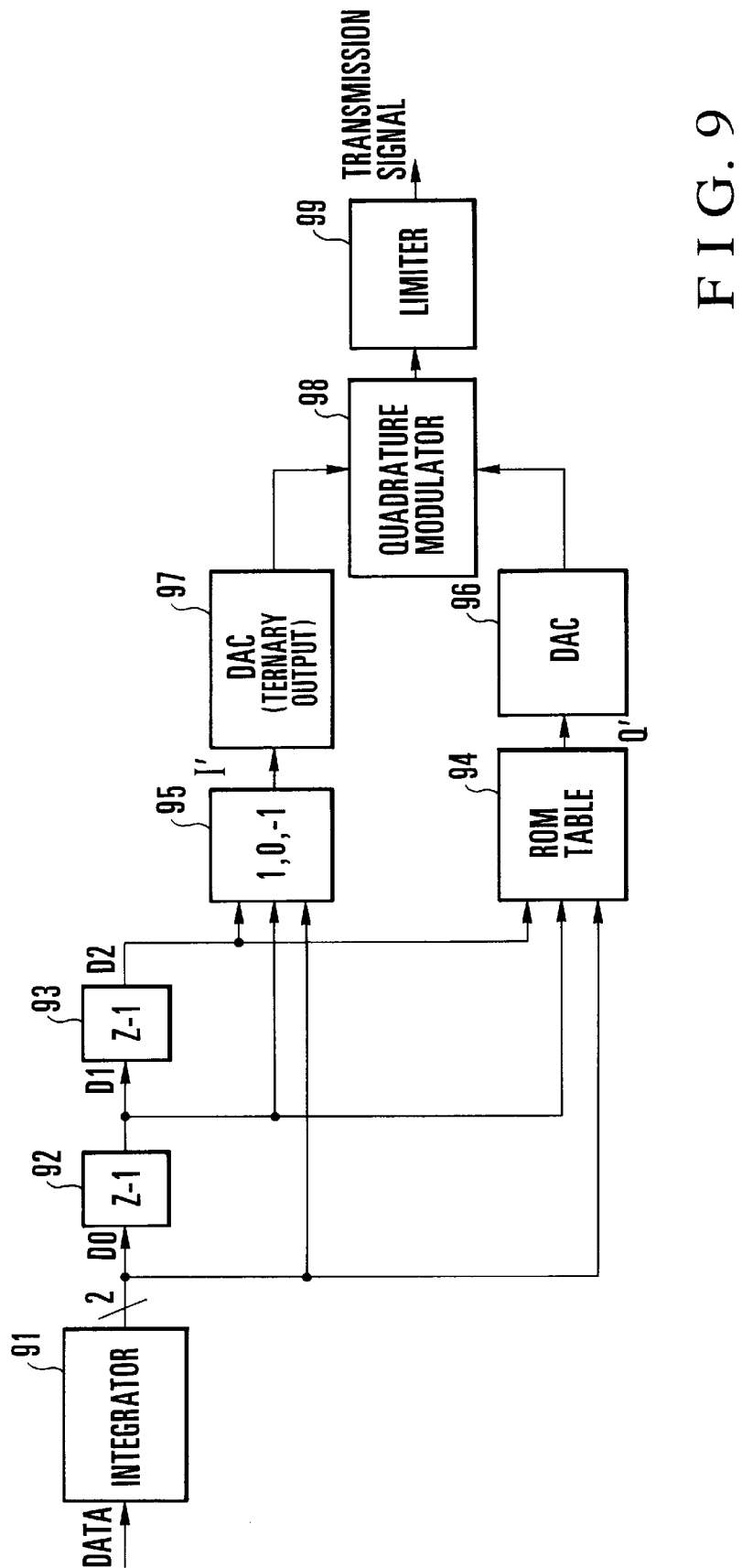
FIG. 9 is a block diagram showing another embodiment of the present invention.

FIG. 9 shows the case in which the present invention is applied to the baseband signal generation circuit of a GMSK (Gaussian-filtered Minimum Shift Keying) modulator. FIG. 10 shows the contents of a ROM table 94 in FIG. 9. As shown in FIG. 9, the baseband signal generation circuit of the GMSK modulator is constituted by an integrator 91, delay elements 92 and 93, a ROM table 94, a selector 95, a D/A converter 96, a ternary output D/A converter 97, a quadrature modulator 98, and a limiter 99. The delay elements 92 and 93 are circuits considering interference between the current symbol and one preceding or succeeding symbol.

An input signal is integrated into 1-symbol 2-bit data by the integrator 91. The 2-bit data is input to the ROM table 94 and selector 95 together with one preceding symbol and one succeeding symbol from the delay elements 92 and 93. At this time, an input symbol sequence is generated by the integrator 91 and thus takes consecutive values like the ones shown in FIG. 10. The signals I' and Q' are respectively converted into analog signal components by the ternary output D/A converter 97 and D/A converter 96. The analog signal components are passed through the quadrature modulator 98 and limiter 99 to be output as a GMSK modulated signal having a uniform amplitude.

According to the present invention, the number of memory devices used in the conventional digital modulator can be decreased to half. The modulator can be realized with a selector relatively small in circuit scale, ternary output D/A converter, and limiter. As a result, the circuit scale and power consumption can be reduced.

What is claimed is:

1. A uniform amplitude modulator comprising:
    means for receiving data represented by phase information and generating in-phase and quadrature components as analog signal components; and
    means for receiving the in-phase and quadrature components and generating a modulated signal whose amplitude is uniform,
    said means for generating in-phase and quadrature components comprising a device for outputting an analog signal component having any one of only three values, the three values comprising predetermined positive and negative values associated with the phase information and a value 0, and further comprising a device for outputting an analog signal component with more than three values associated with the phase information;
    further wherein the modulated signal is a GMSK signal; and
    further comprising integration means for integrating data represented by the phase information into 1-symbol 2-bit data; and
    first and second delay means for delaying the data from said integration means, the 1-symbol 2-bit data from said integration means and said first and second delay means being input to said means for generating in-phase and quadrature components as analog signal components.

2. A modulator according to claim 1,
    wherein said device for outputting an analog signal component having any one of three values comprises a selector for outputting one of three digital data values representing presence/absence and sign of a signal associated with the phase information, and a ternary output D/A converter for converting the digital data into an analog signal component.

3. A modulator according to claim 2, wherein the three digital data values are ±1 and 0.

4. A modulator according to claim 1, wherein said device for outputting an analog signal component associated with the phase information comprises a ROM table in which analog data corresponding to the phase information is stored as a digital value, and a D/A converter for converting the digital value read out from the ROM table into an analog signal component.

5. A modulator according to claim 1, wherein said means for generating a modulated signal whose amplitude is uniform comprises a quadrature modulator for receiving the in-phase and quadrature components and performing quadrature modulation, and a limiter for receiving an output from the quadrature modulator and limiting an amplitude of the output to a predetermined value.

6. A modulator according to claim 1, wherein the modulated signal is a PSK signal.

7. A modulator according to claim 1, wherein the modulated signal is a GMSK signal.

* * * * *